(12) United States Patent
Takahashi et al.

(10) Patent No.: US 12,262,350 B2
(45) Date of Patent: Mar. 25, 2025

(54) USER EQUIPMENT AND BASE STATION APPARATUS

(71) Applicant: NTT DOCOMO, INC., Tokyo (JP)

(72) Inventors: Hideaki Takahashi, Tokyo (JP); Akihito Hanaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 15 days.

(21) Appl. No.: 17/600,470

(22) PCT Filed: Apr. 5, 2019

(86) PCT No.: PCT/JP2019/015173
§ 371 (c)(1),
(2) Date: Sep. 30, 2021

(87) PCT Pub. No.: WO2020/202562
PCT Pub. Date: Oct. 8, 2020

(65) Prior Publication Data
US 2022/0182983 A1     Jun. 9, 2022

(51) Int. Cl.
*H04W 72/02*     (2009.01)
*H04W 72/04*     (2023.01)
(Continued)

(52) U.S. Cl.
CPC ......... *H04W 72/02* (2013.01); *H04W 72/044* (2013.01); *H04W 76/20* (2018.02); *H04W 80/02* (2013.01)

(58) Field of Classification Search
CPC ............... H04W 72/02; H04W 72/044; H04W 76/20; H04W 80/02; H04W 48/12; H04L 5/0044; H04L 5/0091; H04L 5/001
(Continued)

(56) References Cited

U.S. PATENT DOCUMENTS

2019/0045491 A1   2/2019   Zhang et al.
2019/0124558 A1*   4/2019   Ang ................ H04W 36/0016
(Continued)

FOREIGN PATENT DOCUMENTS

EP         3701662 A1    9/2020
WO    2019084184 A1    5/2019

OTHER PUBLICATIONS

Extended European Search Report issued in European Application No. 19922823.0 mailed on Oct. 25, 2022 (8 pages).
(Continued)

*Primary Examiner* — Candal Elpenord
(74) *Attorney, Agent, or Firm* — Osha Bergman Watanabe & Burton LLP

(57) ABSTRACT

A user equipment includes a receiving unit configured to receive, from a base station apparatus, information designating a Bandwidth Part (BWP) of a cell, a control unit configured to configure a BWP to be activated, based on a parameter dedicated to the user equipment included in the information, when: the cell is a Special Cell (SpCell) and a configuration by a Radio Resource Control (RRC) is executed; or the cell is a Secondary Cell (SCell) and a Media Access Control (MAC) layer is activated, and a communication unit configured to communicate with the base station apparatus by using the BWP to be activated, wherein the parameter is configured in information for designating the BWP of the cell, irrespective of the number of BWPs configured for the cell.

6 Claims, 9 Drawing Sheets

(51) Int. Cl.
*H04W 72/044* (2023.01)
*H04W 76/20* (2018.01)
*H04W 80/02* (2009.01)

(58) Field of Classification Search
USPC .................................................. 370/329–330
See application file for complete search history.

(56) References Cited

U.S. PATENT DOCUMENTS

| | | | | |
|---|---|---|---|---|
| 2019/0306915 | A1* | 10/2019 | Jin | H04W 76/28 |
| 2020/0146058 | A1* | 5/2020 | Xu | H04W 72/0453 |
| 2020/0221506 | A1* | 7/2020 | Jeon | H04W 74/0833 |
| 2021/0203468 | A1* | 7/2021 | Yi | H04L 5/0053 |
| 2021/0400763 | A1* | 12/2021 | Zhou | H04W 52/0229 |
| 2022/0039061 | A1* | 2/2022 | Murray | H04W 68/02 |
| 2022/0109547 | A1* | 4/2022 | Svedman | H04L 5/0091 |
| 2022/0110181 | A1* | 4/2022 | Miao | H04L 1/1822 |

OTHER PUBLICATIONS

Huawei, HISilicon, "Clarification of BWP-ToReleaseList", 3GPP TSG-RAN WG2 #105bis, R2-1904798, Xi'an, China, Apr. 8-12, 2019 (7 pages).
Office Action issued in counterpart Japanese Patent Application No. 2021-511063 mailed on Feb. 7, 2023 (6 pages).
International Search Report issued in PCT/JP2019/015173 on Jun. 18, 2019 (5 pages).
Written Opinion of the International Searching Authority issued in PCT/JP2019/015173 on Jun. 18, 2019 (4 pages).
3GPP TS 38.300 V15.4.0; "3rd Generation Partnership Project; Technical Specification Group Radio Access Network; NR; NR and NG-RAN Overall Description; Stage 2 (Release 15)" Dec. 2018 (97 pages).
3GPP TS 38.213 V15.4.0; "3rd Generation Partnership Project; Technical Specification Group Radio Access Network; NR; Physical layer procedures for control (Release 15)" Dec. 2018 (104 pages).
Office Action issued in counterpart Japanese Patent Application No. 2021-511063 mailed on Jul. 18, 2023 (9 pages).
Office Action issued in counterpart Chinese Patent Application No. 201980095105.0 mailed on Jun. 7, 2023 (22 pages).
Huawei, HiSilicon, "Discussion on BWP operation", 3GPP TSG-RAN WG2 Adhoc NR#1087, R2-1810638, Montreal, Canada, Jul. 2-6, 2018 (3 pages).
Office Action issued in the counterpart Indian Application No. 202117047464, mailed on Jun. 26, 2023 (7 pages).
Office Action issued in Chinese Application No. 201980095105.0, Mailed Nov. 14, 2023 (18 pages).
Office Action issued in counterpart Chinese Application No. 201980095105.0, mailed May 6, 2024 (18 pages).
Office Action issued in Indian Application No. 202117047464; Dated May 10, 2024 (3 pages).
Office Action issued in European Application No. 19922823.0; Dated Feb. 6, 2025 (7 pages).

* cited by examiner

ServingCellConfig
The IE *ServingCellConfig* is used to configure (add or modify) the UE with a serving cell, which may be the SpCell or an SCell of an MCG or SCG. The parameters herein are mostly UE specific but partly also cell specific (e.g. in additionally configured bandwidth parts).

ServingCellConfig information element

```
-- ASN1START
-- TAG-SERVINGCELLCONFIG-START

ServingCellConfig ::=          SEQUENCE {
    tdd-UL-DL-ConfigurationDedicated    TDD-UL-DL-ConfigDedicated       OPTIONAL,     -- Cond TDD initialDownlinkBWP                  BWP-DownlinkDedicated           OPTIONAL,     -- Need M
    downlinkBWP-ToReleaseList           SEQUENCE (SIZE (1..maxNrofBWPs)) OF BWP-Id
        OPTIONAL,       -- Need N
    downlinkBWP-ToAddModList            SEQUENCE (SIZE (1..maxNrofBWPs)) OF BWP-Downlink
        OPTIONAL,       -- Need N
    firstActiveDownlinkBWP-Id           BWP-Id                          OPTIONAL,     -- Cond SyncAndCellAdd
    [...]

UplinkConfig ::=               SEQUENCE {
    initialUplinkBWP                    BWP-UplinkDedicated             OPTIONAL,     -- Need M
    uplinkBWP-ToReleaseList             SEQUENCE (SIZE (1..maxNrofBWPs)) OF BWP-Id
        OPTIONAL,       -- Need N
    uplinkBWP-ToAddModList              SEQUENCE (SIZE (1..maxNrofBWPs)) OF BWP-Uplink
        OPTIONAL,       -- Need N
    firstActiveUplinkBWP-Id             BWP-Id                          OPTIONAL,     -- Cond SyncAndCellAdd
    [...]
}

-- TAG-SERVINGCELLCONFIG-STOP
-- ASN1STOP
```

| Conditional Presence | Explanation |
|---|---|
| SyncAndCellAdd | This field is mandatory present for a SpCell upon reconfigurationWithSync (PCell handover, PSCelladdition/change) and upon RRCsetup/RRCResume, irrespective of the number of BWPs configured for the serving cell. The field is mandatory present for an SCell upon addition, irrespective of the number of BWPs configured for the serving cell. For SpCell, the field is optionally present, Need N, upon reconfiguration without reconfigurationWithSync. In all other cases the field is absent. |

USER EQUIPMENT AND BASE STATION APPARATUS

TECHNICAL FIELD

The present invention relates to a user equipment and a base station apparatus in a wireless communication system.

BACKGROUND ART

In NR (New Radio) (also referred to as "5G"), which is the successor system of LTE (Long Term Evolution), techniques for satisfying, as required conditions, higher system capacity, high data transmission speed, low delay, and simultaneous connection of many terminals, low cost, power saving, and the like are being studied (for example, see Non-Patent Document 1).

NR employs a method in which a user equipment uses a part of a carrier bandwidth as a BWP (Bandwidth part). The BWP consists of continuous PRBs (Physical Resource Blocks). In addition, up to four BWPs can be set in each user device in DL (Downlink) or UL (Uplink). When a plurality of BWPs are set, the user equipment performs communication using one active BWP (for example, Non-Patent Document 2).

RELATED ART DOCUMENT

Non-Patent Document

[Non-Patent Document 1] 3GPP TS 38.300 V15.4.0 (2018-12)
[Non-Patent Document 2] 3GPP TS 38.213 V15.4.0 (2018-12)

SUMMARY OF THE INVENTION

Problem to be Solved by the Invention

In a wireless communication system of NR, a user equipment can specify a BWP that is activated first when configuration is executed with an RRC (Radio Resource Control) based on parameters of the user equipment. However, in a case where only a BWP used for the initial access is configured, there are cases where a parameter for specifying the BWP that is first activated when configuration is executed with RRC is not configured.

The present invention has been made in view of the above issues, and it is an object of the present invention to appropriately select a BWP to be used in a wireless communication system to which BWP (Bandwidth Part) is applied.

Means for Solving Problem

According to the technique of the present disclosure, provided is a user equipment includes a receiving unit configured to receive, from a base station apparatus, information designating a Bandwidth Part (BWP) of a cell, a control unit configured to configure a BWP to be activated, based on a parameter dedicated to the user equipment included in the information, when the cell is a Special Cell (SpCell) and a configuration by a Radio Resource Control (RRC) is executed or the cell is a Secondary Cell (SCell) and a Media Access Control (MAC) layer is activated, and a communication unit configured to communicate with the base station apparatus by using the BWP to be activated, wherein the parameter is configured in information for designating the BWP of the cell, irrespective of number of BWPs configured for the cell.

Effect of the Invention

According to the technique of the present disclosure, a BWP to be used can be appropriately in a wireless communication system to which BWP (Bandwidth Part) is applied.

BRIEF DESCRIPTION OF DRAWINGS

FIG. 6 is a specification change example (1) of an operation example according to an embodiment of the present invention;
FIG. 7 is a specification change example (2) of an operation example according to an embodiment of the present invention.

MODE FOR CARRYING OUT THE INVENTION

One or more embodiments of the present invention will be hereinafter described with reference to drawings. The embodiment described below is an example, and the embodiment to which the present invention is applied is not limited to the following embodiment.

In operation of a wireless communication system according to embodiments of the present invention, existing techniques are used as appropriate. However, an example of the existing technique includes an existing LTE, but is not limited to the existing LTE. In addition, the term "LTE" used in this specification has a broad meaning including LTE-Advanced and specifications newer than LTE-Advanced (e.g., NR) unless otherwise specified.

In the embodiments of the present invention described below, terms such as SS (Synchronization signal), PSS (Primary SS), SSS (Secondary SS), PBCH (Physical broadcast channel), PRACH (Physical random access channel), and the like used in the existing LTE are used. This is for convenience of description, and signals, functions, and the like may be referred to as other names. In NR, the above terms correspond to NR-SS, NR-PSS, NR-SSS, NR-PBCH, NR-PRACH, and the like. However, even when signals are used for NR, "NR-" is not necessarily attached thereto.

In the embodiments of the present invention, the duplex method may be a TDD (Time Division Duplex) system, an FDD (Frequency Division Duplex) system, or others (for example, Flexible Duplex and the like).

Further, in the embodiment of the present invention, "to configure" a radio parameter or the like may be that a predetermined value is configured in advance (Pre-configure), or that a radio parameter notified from a base station apparatus 10 or a user equipment 20 is configured.

Figure 1:
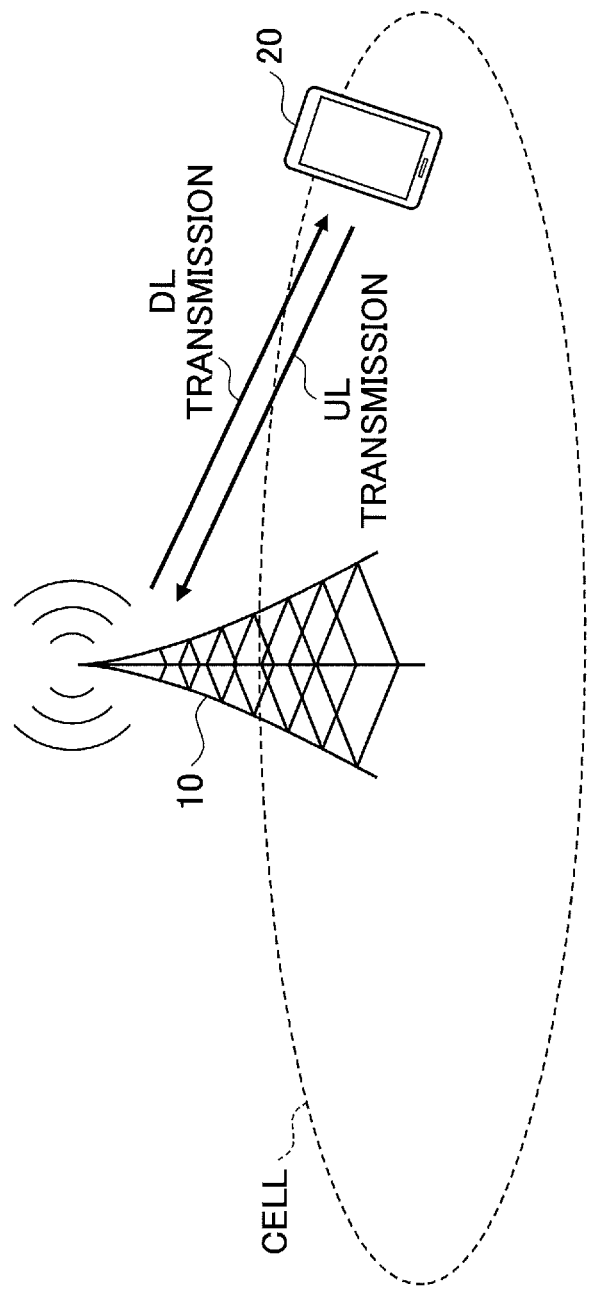
FIG. 1 is a drawing for explaining a wireless communication system according to an embodiment of the present invention.

FIG. 1 is a drawing for explaining a wireless communication system according to an embodiment of the present invention. As illustrated in FIG. 1, a wireless communication system according to an embodiment of the present invention includes a base station apparatus 10 and a user equipment 20. In FIG. 1, one base station apparatus 10 and one user equipment 20 are illustrated, but this is only an example. Alternatively, a plurality of base station apparatuses 10 and user equipments 20 may be provided.

The base station apparatus 10 provides one or more cells, and is a communication apparatus wirelessly communicating with the user equipment 20. The physical resource of a radio signal is defined by time domain and frequency domain. Time domain may be defined by OFDM symbol number. Frequency domain may be defined by the number of subcarriers or the number of resource blocks. The base station apparatus 10 transmits a synchronization signal and system information to the user equipment 20. The synchronization signal is, for example, NR-PSS and NR-SSS. The system information is transmitted in, for example, NR-PBCH, and is also referred to as broadcast information. As illustrated in FIG. 1, the base station apparatus 10 transmits a control signal or data to the user equipment 20 through DL (Downlink), and receives a control signal or data from the user equipment 20 through UL (Uplink). Both the base station apparatus 10 and the user equipment 20 can transmit and receive signals by performing beamforming. In addition, both the base station apparatus 10 and the user equipment 20 can apply communication by MIMO (Multiple Input Multiple Output) to DL or UL. Further, both the base station apparatus 10 and the user equipment 20 may communicate via SCell (Secondary Cell) and PCell (Primary Cell) by CA (Carrier Aggregation).

The user equipment 20 is a communication apparatus equipped with a wireless communication function such as a smartphone, a mobile phone, a tablet, a wearable terminal, and a communication module for M2M (Machine-to-Machine). As illustrated in FIG. 1, the user equipment 20 receives control signals or data from the base station apparatus 10 in DL, and transmits control signals or data to the base station apparatus 10 in UL, thereby using various communication services provided by the wireless communication system.

Figure 2:
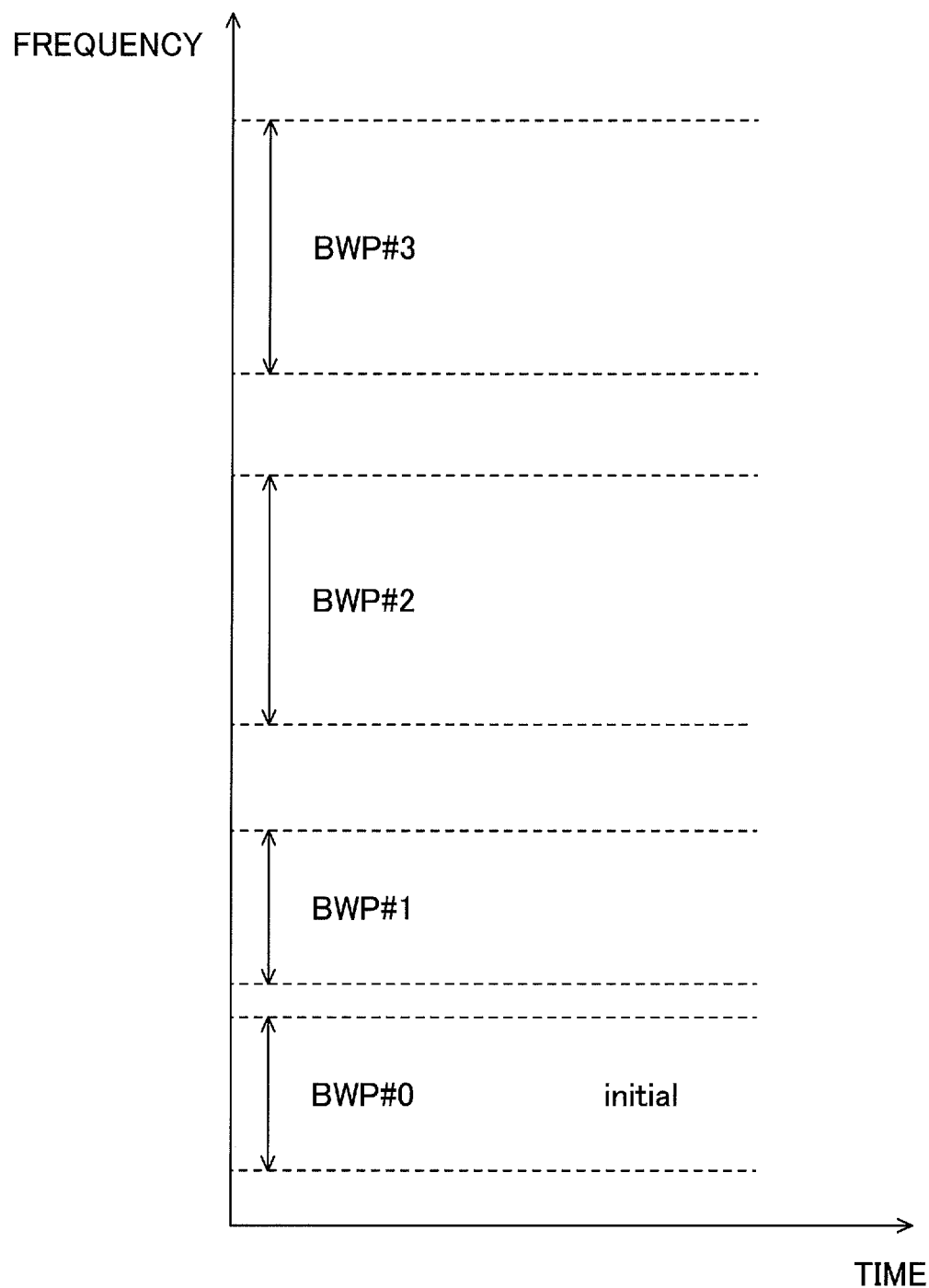
FIG. 2 is a drawing for explaining BWP.

FIG. 2 is a drawing for explaining BWP. FIG. 2 is an example in which four BWPs (Bandwidth parts) BWP #0, BWP #1, BWP #2, and BWP #3 are configured. The four BWPs illustrated in FIG. 2 may be configured for DL or UL. The four BWPs illustrated in FIG. 2 are arranged in a carrier bandwidth of a certain cell. BWP #0 is an initial BWP. The initial BWP may be designated by higher layers, or may be defined in a part of a control resource set of type0 PDCCH (Physical Downlink Control Channel) common search space, and is used to establish connection. The used BWP is an active BWP. In a case where a plurality of BWPs are configured, any one of the BWPs becomes an active BWP. A BWP used when an inactivity timer for BWP is finished is the default BWP. In a case where a default BWP is not designated by higher layers, the initial BWP may be used as the default BWP. In the following explanation, the initial BWP may be an initial DL BWP, or may be an initial UL BWP. Likewise, in the following explanation, the default BWP may be a default DL BWP, or may be a default UL BWP. Likewise, in the following explanation, the active BWP may be an active DL BWP, or may be an active UL BWP.

Figure 3:
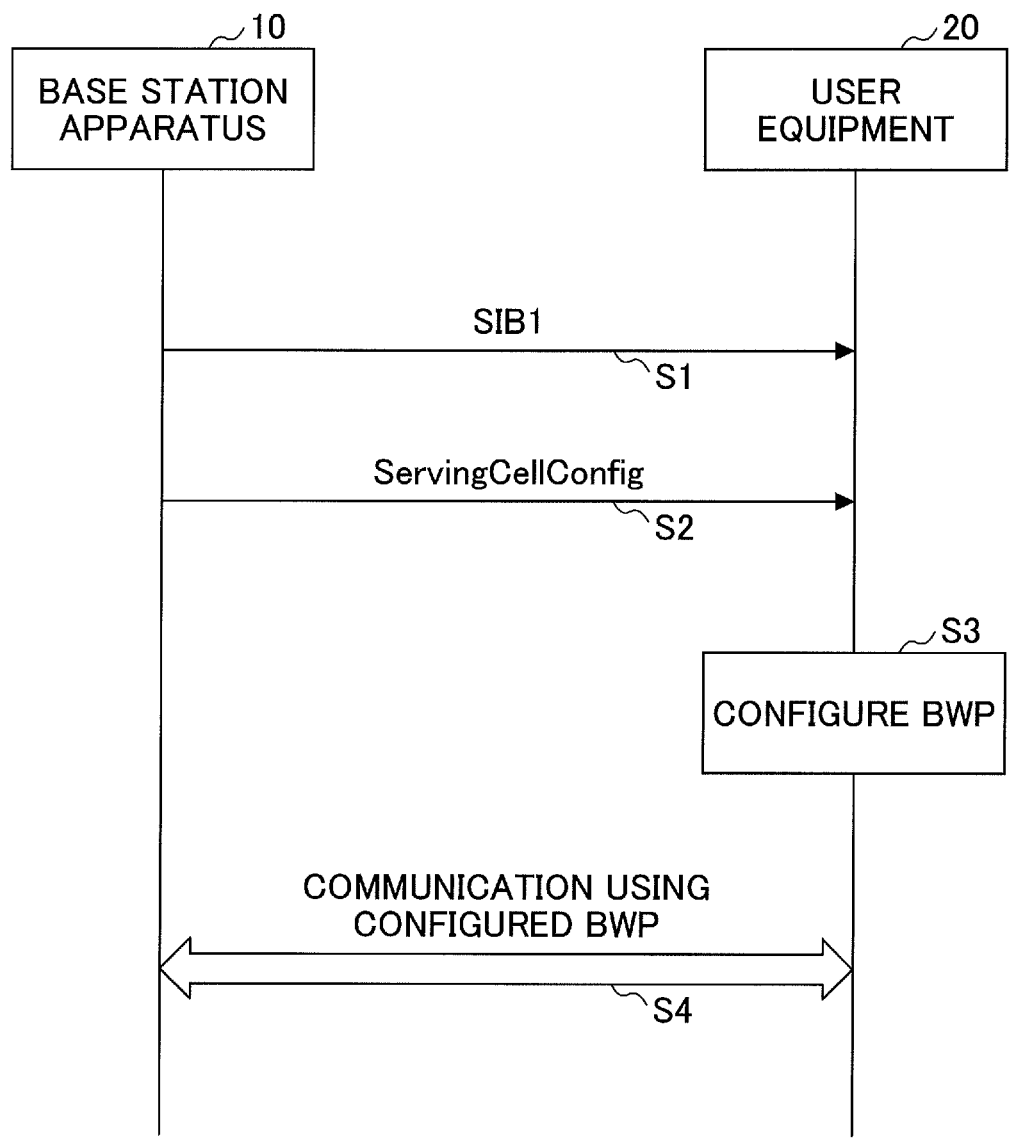
FIG. 3 is a sequence diagram for explaining an operation example according to an embodiment of the present invention.

FIG. 3 is a sequence diagram for explaining an operation example according to an embodiment of the present invention. An operation example in which a user equipment 20 performs communication by configuring a BWP will be explained with reference to FIG. 3.

In step S1, the base station apparatus 10 transmits "SIB1", which is system information applied commonly in a cell, to the user equipment 20. The user equipment 20 configures parameters applied commonly in the cell by "SIB1". "SIB1" includes an information element "ServingCellConfigCommon". With "ServingCellConfigCommon", the user equipment 20 can configure the initial BWP, i.e., BWP #0.

Next, in step S2, the base station apparatus 10 transmits, to the user equipment 20, an information element "ServingCellConfig" applied dedicatedly to the UE (User Equipment). For example, "ServingCellConfig" may be received via "RRC reconfiguration" which is an RRC (Radio Resource Control) message by the user equipment 20. With "ServingCellConfig", the user equipment 20 mainly configures parameters dedicatedly applied to the UE. "ServingCellConfig" includes an information element "firstActiveDownlinkBWP-Id". Also, "ServingCellConfig" includes an information element "firstActiveUplinkBWP-Id".

In a case where "ServingCellConfig" is a configuration for SpCell (Special Cell), "firstActiveDownlinkBWP-Id" designates DL-BWP that is first activated when a configuration is executed with an RRC, "firstActiveUplinkBWP-Id" designates UL-BWP that is first activated when a configuration is executed with an RRC. In a case where "ServingCellConfig" is a configuration for SCell (Secondary cell), "firstActiveDownlinkBWP-Id" designates DL-BWP used to activate a MAC (Media Access Control) layer, and "firstActiveUplinkBWP-Id" designates a UL-BWP that is first activated when a MAC layer is activated.

Subsequently, in step S3, the user equipment 20 configures an active BWP based on a configuration related to the BWP received from the base station apparatus 10. Here, in a case where only the initial BWP is configured, in the information element "firstActiveDownlinkBWP-Id" and the information element "firstActiveUplinkBWP-Id", it is not clear as to whether parameters are configured or not. Therefore, in an embodiment of the present invention, a condition for configuring the parameter is clarified.

In step S4, the user equipment 20 performs communication with the base station apparatus 10 by using the configured active BWP.

Figure 4:
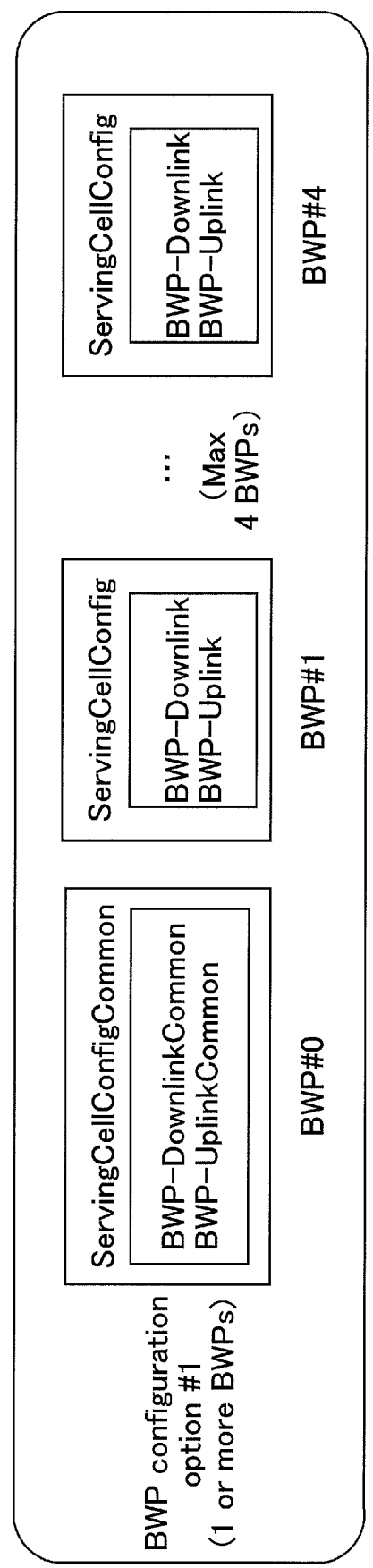
FIG. 4 is a drawing for illustrating a configuration example (1) of BWP according to an embodiment of the present invention.

FIG. 4 is a drawing for illustrating a configuration example (1) of BWP according to an embodiment of the present invention. As illustrated in FIG. 4, the initial BWP, i.e., BWP #0, is configured based on "BWP-DownlinkCommon" and "BWP-UplinkCommon" included in the information element "ServingCellConfigCommon". Up to four BWPs, i.e., BWP #1 to BWP #4, are configured based on "BWP-Downlink" and "BWP-Uplink" included in the information element "ServingCellConfig".

In the example as illustrated in FIG. 4, BWP #0 is configured by "ServingCellConfigCommon", and is not configured by "ServingCellConfig". In the example as illustrated in FIG. 4, BWP #0 is not considered to be an RRC-configured BWP, and is configured only by "SIB1".

For example, although DCI (Downlink Control Information) format 1_0 can be used with BWP #0 without dedicated configurations, changing to another BWP requires configuration by RRC because DCI format 1_0 does not support DCI-based BWP switching.

Figure 5:
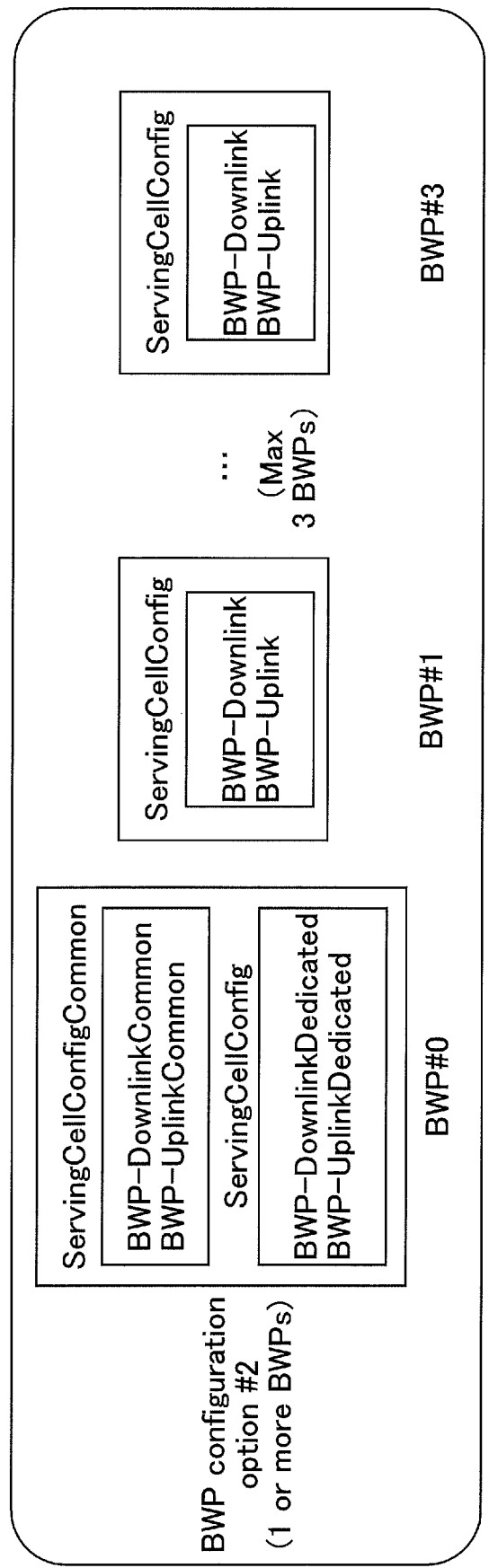
FIG. 5 is a drawing for illustrating a configuration example (2) of BWP according to an embodiment of the present invention.

FIG. 5 is a drawing for illustrating a configuration example (2) of BWP according to an embodiment of the present invention. As illustrated in FIG. 5, the initial BWP, i.e., BWP #0, is configured based on "BWP-DownlinkCommon" and "BWP-UplinkCommon" included in the information element "ServingCellConfigCommon". Further, BWP #0 is configured based on "BWP-DownlinkDedicated" and "BWP-UplinkDedicated" included in the information element "ServingCellConfig". Also, up to three BWPs, i.e., BWP #1 to BWP #3, are configured based on "BWP-Downlink" and "BWP-Uplink" included in the information element "ServingCellConfig".

In the example as illustrated in FIG. 5, BWP #0 is configured by both of "ServingCellConfigCommon" and "ServingCellConfig". In the example as illustrated in FIG. 5, BWP #0 is considered to be an RRC-configured BWP. Therefore, switching of BWP from BWP #0 can be performed via DCI, and there are fewer limitations on the use of the BWP #0 as compared to the BWP #0 as illustrated in FIG. 4.

In the example as illustrated in FIG. 5, to support the same BWP #0, "BWP-DownlinkCommon" and "BWP-UplinkCommon", and "BWP-DownlinkDedicated" and "BWP-UplinkDedicated" should match in parameters. In other words, parameters related to BWP #0 included in "BWP-DownlinkCommon" and "BWP-UplinkCommon" and parameters related to BWP #0 included in "BWP-DownlinkDedicated" and "BWP-UplinkDedicated" may be the same as each other.

FIG. 6 is a specification change example (1) of an operation example according to an embodiment of the present invention. As illustrated in FIG. 6, in "firstActiveDownlinkBWP-Id", "BWP-Id" indicating a BWP is configured. A condition for existence of the parameter is "SyncAndCellAdd". Likewise, in "firstActiveUplinkBWP-Id", "BWP-Id" indicating BWP is configured. A condition for existence of the parameter is "SyncAndCellAdd". The condition "SyncAndCellAdd" will be explained in FIG. 7.

FIG. 7 is a specification change example (2) of an operation example according to an embodiment of the present invention. As illustrated in FIG. 7, SyncAndCellAdd is a field mandatorily present for a SpCell for reconfiguration with synchronization (reconfigurationWithSync) or for a SpCell for an RRC connection setup (RRCsetup) or an RRC connection resume (RRCResume), irrespective of the number of BWPs configured for the SpCell. Therefore, a field to which the condition "SyncAndCellAdd" is applied is a field mandatorily present, irrespective of whether only BWP #0 is configured for the SpCell. Reconfiguration with synchronization is executed, for example, in handover of PCell (Primary Cell) or addition or change of PSCell (Primary Secondary Cell).

As illustrated in FIG. 7, the condition "SyncAndCellAdd" indicates a field mandatorily present for an SCell for addition, irrespective of the number of BWPs configured for the SCell. Therefore, a field to which the condition "SyncAndCellAdd" is applied is a field mandatorily present, irrespective of whether only BWP #0 is configured for the SCell.

In a case where a BWP as illustrated in FIG. 5 is configured, only the initial BWP may be configured, and therefore, a field to which the condition "SyncAndCellAdd" is applied is a field mandatorily present even in a case where only BWP #0 is configured for SpCell or SCell.

According to the above embodiment, when the user equipment 20 executes configuration by RRC or activates a MAC layer, the user equipment 20 can designate DL-BWP and UL-BWP that is activated first, irrespective of the number of BWPs configured for the serving cell. More specifically, when configuration by RRC is executed or a MAC layer is activated, DL-BWP and UL-BWP that is activated first can be designated in a case where only the initial BWP is configured for the serving cell.

More specifically, a BWP to be used can be appropriately selected in a wireless communication system to which BWP (Bandwidth Part) is applied.

Apparatus Configuration

Next, an example of functional configuration of the base station apparatus 10 and the user equipment 20 that execute the processing and operations described so far will be described. The base station apparatus 10 and the user equipment 20 include a function for implementing the above-described embodiment. However, each of the base station apparatus 10 and the user equipment 20 may have only some of the functions in the embodiment.

Base Station Apparatus 10

Figure 8:
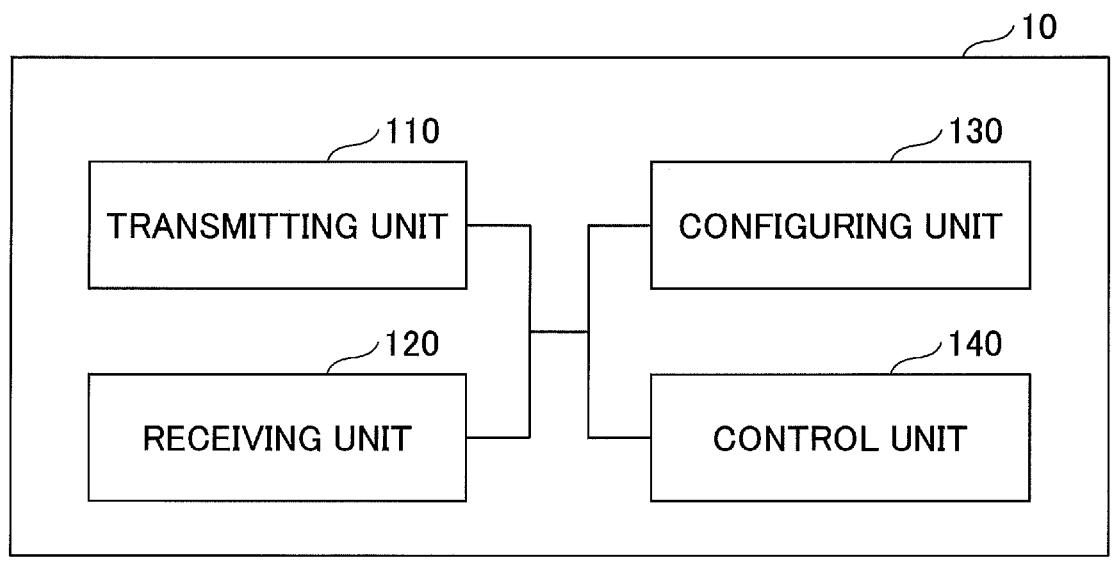
FIG. 8 is a drawing illustrating an example of a functional configuration of a base station apparatus 10 according to an embodiment of the present invention.

FIG. 8 is a drawing illustrating an example of a functional configuration of the base station apparatus 10. As illustrated in FIG. 8, the base station apparatus 10 includes a transmitting unit 110, a receiving unit 120, a configuring unit 130, and a control unit 140. The functional configuration illustrated in FIG. 8 is only an example. As long as the operation according to the embodiment of the present invention can be executed, the functions may be divided in any way, and the functional units may be given any names.

The transmitting unit 110 includes a function of generating signals to be transmitted to the user equipment 20 and wirelessly transmitting the signals. The receiving unit 120 includes a function of receiving various types of signals transmitted from the user equipment 20 and acquiring, for example, information on a higher layer from the received signals. Further, the transmitting unit 110 has a function of transmitting NR-PSS, NR-SSS, NR-PBCH, a DL/UL control signal, a DL reference signal or the like to the user equipment 20.

The configuring unit 130 stores configuration information configured in advance and various configuration information to be transmitted to the user equipment 20 in a storage device and reads out the configuration information from the storage device as needed. The contents of the configuration information are, for example, communication configuration related to a cell of the user equipment 20, communication configuration related to BWP, and the like.

As explained in the embodiment, the control unit 140 performs processing related to communication configuration related to cell or BWP of the user equipment 20. A functional unit configured to transmit signals in the control unit 140 may be included in the transmitting unit 110, and a functional unit configured to receive signals in the control unit 140 may be included in the receiving unit 120.

User Equipment 20

Figure 9:
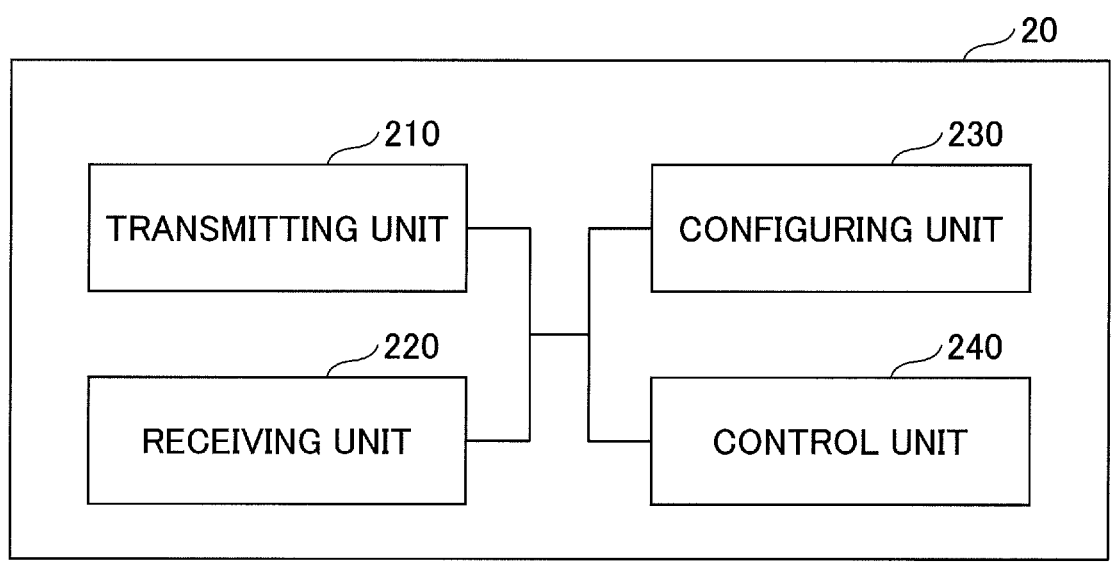
FIG. 9 is a drawing illustrating an example of a functional configuration of a user equipment 20 according to an embodiment of the present invention.

FIG. 9 is a drawing illustrating an example of a functional configuration of the user equipment 20. As illustrated in FIG. 9, the user equipment 20 includes a transmitting unit 210, a receiving unit 220, a configuring unit 230, and a control unit 240. The functional configuration illustrated in FIG. 9 is merely an example. As long as the operation according to the embodiment of the present invention can be executed, the functions may be divided in any way, and the function units may be given any names.

The transmitting unit 210 generates a transmission signal from transmission data and wirelessly transmits the transmission signal. The receiving unit 220 wirelessly receives various types of signals, and acquires a signal in a higher-layer from the received signal in the physical layer. Also, the receiving unit 220 has a function of receiving NR-PSS, NR-SSS, NR-PBCH, DL/UL/SL control signals, reference signals, and the like that are transmitted from the base station apparatus 10. Also, for example, the transmitting unit 210 transmits, as D2D communication, PSCCH (Physical Sidelink Control Channel), PSSCH (Physical Sidelink Shared Channel), PSDCH (Physical Sidelink Discovery Channel), PSBCH (Physical Sidelink Broadcast Channel), and the like to another user equipment 20, and the receiving unit 120 receives PSCCH, PSSCH, PSDCH, PSBCH, or the like from another user equipment 20.

The configuring unit 230 stores in a storage device various types of configuration information received from the base station apparatus 10 or the user equipment 20 by the receiving unit 220 and reads out the configuration information from the storage device as needed. The configuring unit 230 also stores configuration information configured in advance. The contents of the configuration information are, for example, communication configuration related to a cell, communication setting related to BWP, and the like.

As explained in the embodiment, the control unit 240 controls communication to which BWP is applied, based on communication configuration obtained from the base station apparatus 10. A functional unit configured to transmit signals in the control unit 240 may be included in the transmitting unit 210, and a functional unit configured to receive signals in the control unit 240 may be included in the receiving unit 220.

Hardware Configuration

The block diagrams (FIGS. 8 and 9) used for explaining the above embodiments illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

Figure 10:
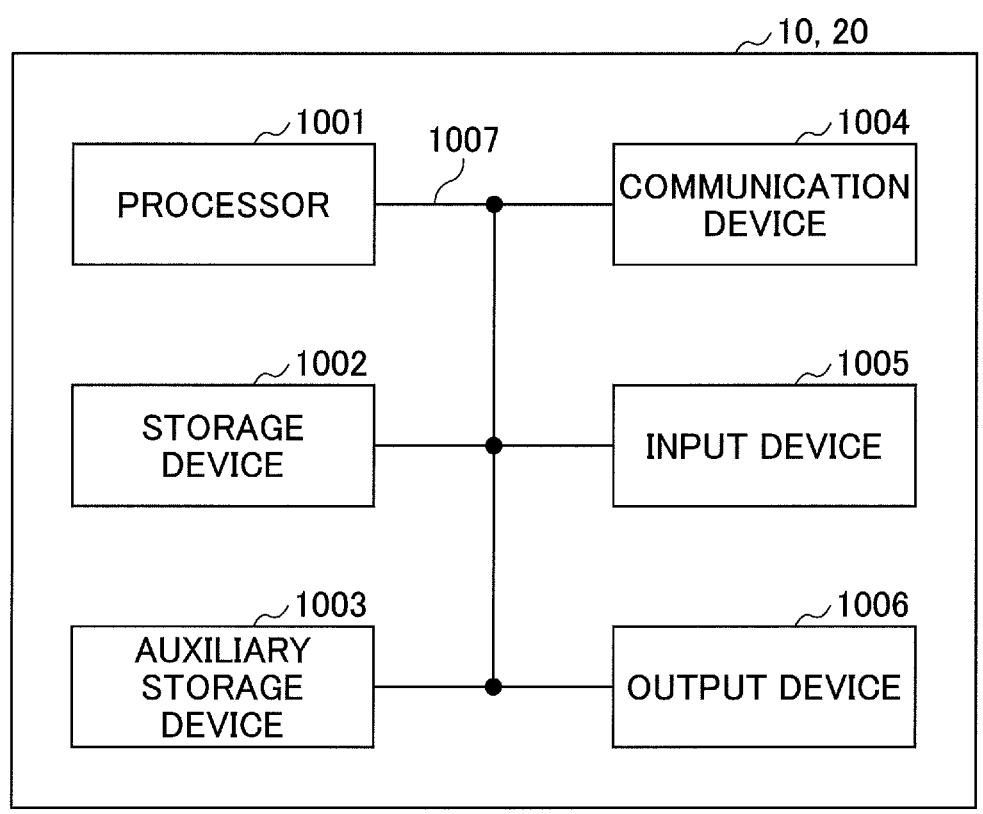
FIG. 10 is a drawing illustrating an example of a hardware configuration of the base station apparatus 10 or the user equipment 20 according to an embodiment of the present invention.

For example, the base station apparatus 10, the user equipment 20, and the like according to one embodiment of the present disclosure may function as a computer that performs processing of a wireless communication according to the present disclosure. FIG. 10 is a drawing illustrating an example of a hardware configuration of the base station apparatus 10 or the user equipment 20 according to an embodiment of the present disclosure. Each of the base station apparatus 10 and user equipment 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user equipment 20 may be configured to include one or more of the devices illustrated in drawings, or may be configured not to include some of the devices.

Each function of the base station apparatus 10 and the user equipment 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station apparatus 10, as illustrated in FIG. 8 may be implemented by a control program that is stored in the storage device 1002 and that is executed by the processor 1001. Also, for example, the control unit 240 of the user equipment 20, as illustrated in FIG. 9, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user equipment 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

Summary of Embodiment

As described above, according to an embodiment of the present invention, provided is a user equipment includes a receiving unit configured to receive, from a base station apparatus, information designating a Bandwidth Part (BWP) of a cell, a control unit configured to configure a BWP to be activated, based on a parameter dedicated to the user equipment included in the information, when the cell is a Special Cell (SpCell) and a configuration by a Radio Resource Control (RRC) is executed or the cell is a Secondary Cell (SCell) and a Media Access Control (MAC) layer is activated, and a communication unit configured to communicate with the base station apparatus by using the BWP to be activated, wherein the parameter is configured in information for designating the BWP of the cell, irrespective of number of BWPs configured for the cell.

According to the above configuration, when configuration by RRC is executed or a MAC layer is activated, the user equipment 20 can designate DL-BWP and UL-BWP that is activated first, irrespective of the number of BWPs configured for the serving cell. More specifically, when configuration by RRC is executed or a MAC layer is activated, DL-BWP and UL-BWP that is activated first can be designated in a case where only the initial BWP is configured for the serving cell. More specifically, a BWP to be used can be appropriately selected in a wireless communication system to which BWP (Bandwidth Part) is applied.

The parameter may be configured in the information for designating the BWP in a case where only an initial BWP is configured for the cell. According to the above configuration, when configuration by RRC is executed or a MAC layer is activated, the user equipment 20 can designate DL-BWP and UL-BWP that is activated first in a case where only the initial BWP is configured for the serving cell.

The information for designating the BWP of the cell may include a configuration related to the cell common in the cell and a configuration related to the cell dedicated to the user equipment, and the configuration related to the cell common in the cell and the configuration related to the cell dedicated to the user equipment may be a same in a parameter related to the initial BWP. According to the above configuration, the user equipment 20 can designate DL-BWP and UL-BWP that is activated first in a case where only the initial BWP is configured for the serving cell.

The configuration by the RRC may be a reconfiguration with synchronization, an RRC connection setup, or an RRC connection resume. According to the above configuration, when the user equipment 20 executes configuration by RRC, the user equipment 20 can designate DL-BWP and UL-BWP that is activated first, irrespective of the number of BWPs configured for the serving cell.

According to the embodiment of the present invention, provided is a base station apparatus including a receiving unit configured to transmit, to a user equipment, information designating a BWP (Bandwidth Part) of a cell, a control unit configured to configure a BWP to be activated, based on a parameter dedicated to the user equipment included in the information, when the cell is a SpCell (Special Cell) and a configuration by an RRC (Radio Resource Control) is executed or the cell is an SCell (Secondary Cell) and a MAC (Media Access Control) layer is activated, and a communication unit configured to communicate with the user equipment by using the BWP to be activated, wherein the parameter is configured in information for designating the BWP, irrespective of the number of BWPs configured for the cell.

According to the above configuration, when configuration by RRC is executed or a MAC layer is activated, the user equipment 20 can designate DL-BWP and UL-BWP that is activated first, irrespective of the number of BWPs configured for the serving cell. More specifically, when configuration by RRC is executed or a MAC layer is activated, DL-BWP and UL-BWP that is activated first can be designated in a case where only the initial BWP is configured for the serving cell. More specifically, a BWP to be used can be appropriately selected in a wireless communication system to which BWP (Bandwidth Part) is applied.

Supplements to Embodiment

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiments, the orders of steps may be changed unless a contradiction arises. For the sake of convenience for describing the processing, the base station apparatus 10 and the user equipment 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user equipment 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and an S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station according to the present disclosure may be read as a user terminal. For example, each aspect or embodiment of the present disclosure may be applied to a configuration in which communication between a base station and a user terminal is replaced by communication between a plurality of user equipments 20 (that may be called D2D (Device-to-Device), V2X (Vehicle-to-Everything), or the like). In this case, a user equipment 20 may have above-described functions of the base station apparatus 10. In this regard, a word such as "up" or "down" may be read as a word corresponding to communication between terminals (for example, "side"). For example, an uplink channel, a downlink channel, or the like may be read as a side channel.

Similarly, a user terminal according to the present disclosure may be replaced with a base station. In this case, a base station may have above-described functions of the user terminal.

The terms "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, the term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiple Access) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural form.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, the transmitting unit 210 and the receiving unit 220 are examples of a communication unit. The transmitting unit 110 and the receiving unit 120 are examples of a communication unit. "ServingCellConfigCommon" or "ServingCellConfig" is an example of information for designating a BWP of a cell. "ServingCellConfigCommon" is an example of a configuration related to the cell common in the cell. "ServingCellConfig" is an example of a configuration related to the cell dedicated to the user equipment. "FirstActiveDownlinkBWP-Id" or "firstActiveUplinkBWP-Id" is an example of a parameter dedicated to the user equipment.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

REFERENCE SIGNS LIST 10 base station apparatus
110 transmitting unit
120 receiving unit
130 configuring unit
140 control unit
20 user equipment
210 transmitting unit
220 receiving unit
230 configuring unit
240 control unit
1001 processor
1002 storage device
1003 auxiliary storage device
1004 communication device
1005 input device
1006 output device

The invention claimed is:

1. A terminal comprising:
a transceiver that receives, from a base station apparatus, configuration information designating a Bandwidth Part (BWP) configured for a cell and a system information block 1 (SIB1); and
a processor that designates, based on a parameter included in the configuration information,
a BWP to be activated when the cell is a Special Cell (SpCell) and a configuration is executed with a Radio Resource Control (RRC), or
a BWP to be activated when the cell is a Secondary Cell (SCell) and a Media Access Control (MAC) layer is activated,
wherein the transceiver communicates with the base station apparatus by using the BWP,
wherein the parameter includes a field that is mandatorily present when the cell is the SpCell or the SCell,
wherein the parameter is configured in the configuration information in a case where only an initial BWP is configured for the cell,
wherein the parameter includes a first identity of an uplink BWP and a second identity of a downlink BWP, and the first identity and the second identity have a same value, and
wherein the processor configures the initial BWP based on an information element in the SIB1.

2. The terminal according to claim 1, wherein the configuration information includes a configuration related to the cell common to the cell and a configuration related to the cell dedicated for the terminal, and the configuration related to the cell common to the cell and the configuration related to the cell dedicated for the terminal have a same parameter related to the initial BWP.

3. The terminal according to claim 1, wherein the configuration executed with the RRC is any one of a reconfiguration with synchronization, an RRC connection setup, and an RRC connection resume.

4. A base station apparatus comprising:
a transceiver that transmits, to a terminal, configuration information designating a Bandwidth Part (BWP) configured for a cell and a system information block 1 (SIB1); and
a processor that designates, based on a parameter included in the configuration information,
a BWP to be activated when the cell is a Special Cell (SpCell) and a configuration is executed with a Radio Resource Control (RRC), or
a BWP to be activated when the cell is a Secondary Cell (SCell) and a Media Access Control (MAC) layer is activated,
wherein the transceiver communicates with the terminal by using the BWP,
wherein the parameter includes a field that is mandatorily present when the cell is the SpCell or the SCell,
wherein the parameter is configured in the configuration information in a case where only an initial BWP is configured for the cell,
wherein the parameter includes a first identity of an uplink BWP and a second identity of a downlink BWP, and the first identity and the second identity have a same value, and
wherein the processor configures the initial BWP based on an information element in the SIB1.

5. A communication method performed by a terminal comprising:
receiving, from a base station apparatus, configuration information designating a Bandwidth Part (BWP) configured for a cell and a system information block 1 (SIB1);
designating, based on a parameter included in the configuration information,
a BWP to be activated when the cell is a Special Cell (SpCell) and a configuration is executed with a Radio Resource Control (RRC), or a BWP to be activated when the cell is a Secondary Cell (SCell) and a Media Access Control (MAC) layer is activated; and communicating with the base station apparatus by using the BWP, wherein the parameter includes a field that is mandatorily present when the cell is the SpCell or the SCell, wherein the parameter is configured in the configuration information in a case where only an initial BWP is configured for the cell, wherein the parameter includes a first identity of an uplink BWP and a second identity of a downlink BWP, and the first identity and the second identity have a same value and wherein the initial BWP is configured based on an information element in the SIB1.

6. A system comprising: a terminal; and a base station apparatus, wherein the terminal includes:
- a transceiver of the terminal that receives, from the base station apparatus, configuration information designating a Bandwidth Part (BWP) configured for a cell; and
- a processor of the terminal that designates, based on a parameter included in the configuration information,
- a BWP of the terminal to be activated when the cell is a Special Cell (SpCell) and a configuration is executed with a Radio Resource Control (RRC), or
- a BWP of the terminal to be activated when the cell is a Secondary Cell (SCell) and a Media Access Control (MAC) layer is activated, wherein the transceiver communicates with the base station apparatus by using the BWP, and wherein the base station apparatus includes:
- a transceiver of the base station apparatus that transmits, to the terminal, configuration information designating a BWP configured for a cell and a system information block 1 (SIB1); and
- a processor of the base station apparatus that designates, based on a parameter included in the configuration information,
- a BWP of the base station apparatus to be activated when the cell is an SpCell and a configuration is executed with an RRC, or
- a BWP of the base station apparatus to be activated when the cell is an SCell and a MAC layer is activated, wherein the transceiver of the base station apparatus communicates with the terminal by using the BWP, wherein the parameter includes a field that is mandatorily present when the cell is the SpCell or the SCell, wherein the parameter is configured in the configuration information in a case where only an initial BWP is configured for the cell, wherein the parameter includes a first identity of an uplink BWP and a second identity of a downlink BWP, and the first identity and the second identity have a same value, and wherein the processor of the base station apparatus configures the initial BWP based on an information element in the SIB1.

* * * * *